US010681085B2

(12) United States Patent
Chen et al.

(10) Patent No.: US 10,681,085 B2
(45) Date of Patent: Jun. 9, 2020

(54) QUICK TRANSPORT LAYER SECURITY/SECURE SOCKETS LAYER CONNECTION FOR INTERNET OF THINGS DEVICES

(71) Applicant: International Business Machines Corporation, Armonk, NY (US)

(72) Inventors: Kuo-Chun Chen, New Taipei (TW); Wei-Hsiang Hsiung, Taipei (TW); Sheng-Tung Hsu, Taipei (TW); Jia-Sian Jhang, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 15/784,407

(22) Filed: Oct. 16, 2017

(65) Prior Publication Data
US 2019/0116205 A1    Apr. 18, 2019

(51) Int. Cl.
*H04L 29/06* (2006.01)
(52) U.S. Cl.
CPC ........ *H04L 63/166* (2013.01); *H04L 63/0281* (2013.01); *H04L 63/0807* (2013.01)
(58) Field of Classification Search
CPC ..... H04L 63/166; H04L 63/08; H04L 67/125; H04L 67/10; H04L 9/0637; H04L 9/0643; H04L 9/0825; H04L 2209/56; H04L 2209/38; H04B 7/15521; H04W 84/12
USPC ...................................... 726/4.4, 5; 370/315
See application file for complete search history.

(56) References Cited

U.S. PATENT DOCUMENTS

| 7,149,892 | B2 | 12/2006 | Freed et al. |
| 7,853,781 | B2 | 12/2010 | Freed et al. |
| 9,124,629 | B1 | 9/2015 | Bowen |
| 9,210,163 | B1 | 12/2015 | Hughes et al. |
| 9,847,875 | B1 * | 12/2017 | Berzin ................. H04L 9/0847 |

(Continued)

FOREIGN PATENT DOCUMENTS

WO    WO-2012156365 A1 * 11/2012    ......... H04L 63/0853

OTHER PUBLICATIONS

Mika Mori et al., Secure connection assistance architecture for IoT devices, Jun. 13-15, 2016, 2016 IEEE International Symposium on Local and Metropolitan Area Networks (LANMAN), pp. 1-3.*

(Continued)

*Primary Examiner* — Farid Homayounmehr
*Assistant Examiner* — Raied A Salman
(74) *Attorney, Agent, or Firm* — Yee & Associates, P.C.

(57) ABSTRACT

Establishing Transport Layer Security/Secure Sockets Layer (TLS/SSL) sessions with destination servers for Internet of Things (IoT) devices is provided. A request is sent to establish a TLS/SSL session with a target destination server in a set of destination servers using destination server information related to a particular IoT device in a plurality of IoT devices. A TLS/SSL session is established with the target destination server corresponding to the particular IoT device. TLS/SSL session credential information is received for the particular IoT device from the target destination server. The TLS/SSL session credential information for the particular IoT device is saved in a session credential information table. The TLS/SSL session is suspended with the target destination server corresponding to the particular IoT device.

17 Claims, 7 Drawing Sheets

(56) References Cited

U.S. PATENT DOCUMENTS

| | | | | |
|---|---|---|---|---|
| 2014/0289826 | A1* | 9/2014 | Croome | H04L 67/141 726/5 |
| 2014/0298415 | A1* | 10/2014 | Xie | H04L 61/2589 726/3 |
| 2015/0043421 | A1* | 2/2015 | Shimizu | H04W 84/12 370/315 |
| 2016/0182459 | A1 | 6/2016 | Britt et al. | |
| 2017/0127280 | A1 | 5/2017 | Backholm et al. | |
| 2017/0142100 | A1 | 5/2017 | Bollay et al. | |
| 2018/0007140 | A1* | 1/2018 | Brickell | H04W 4/80 |
| 2019/0165932 | A1* | 5/2019 | Vincent | G06Q 20/065 |

OTHER PUBLICATIONS

Bernat, "Speeding up SSL: enabling session reuse", Published Sep. 27, 2011, last updated Aug. 2017, 10 pages. https://vincent.bernat.im/en/blog/2011-ssl-session-reuse-rfc5077.

Dierks et al., "The Transport Layer Security (TLS) Protocol Version 1.2", Network Working Group, Aug. 2008, 104 pages.

Lin, "TLS Session Resumption: Full-speed and Secure", Cloudflare, Feb. 24, 2015, 6 pages. https://blog.cloudflare.com/tls-session-resumption-full-speed-and-secure/.

Livingston, "Outbound SSL Performance in Node.js", PayPal Engineering, Apr. 1, 2014, 6 pages.

Mukherjee et al., "Securing IoT data over the network", International Business Machines Corporation, May 16, 2016, 15 pages.

Salowey et al., Transport Layer Security (TLS) Session Resumption without Server-Side State, Network Working Group, Jan. 2008, 20 pages.

Tschofenig et al., "Transport Layer Security (TLS)/Datagram Transport Layer Security (DTLS) Profiled for the Internet of Things", IETF Trust, Jul. 2016, 61 pages.

"Top 10 2014-I4 Lack of Transport Encryption", OWASP, last updated Feb. 5, 2016, 2 pages. https://www.owasp.org/index.php?title=Top_10_2014-I4_Lack_of_Transport_Encryption&oldid=208169.

"Top 10 IoT Vulnerabilities (2014)", OWASP, last updated Dec. 1, 2015, 1 page. https://www.owasp.org/index.php?title=Top_10_IoT_Vulnerabilities_(2014)&oldid=204213.

* cited by examiner

QUICK TRANSPORT LAYER SECURITY/SECURE SOCKETS LAYER CONNECTION FOR INTERNET OF THINGS DEVICES

BACKGROUND

1. Field

The disclosure relates generally to network data security and more specifically to quickly establishing a Transport Layer Security/Secure Sockets Layer session connection between an Internet of Things device and a target destination server.

2. Description of the Related Art

Typically, data sent via a network between a client device and server is sent in plain text, which leaves the data vulnerable to eavesdropping. If an unknown third party is able to intercept the data being sent between the client device and server, the third party can see, use, and/or alter that information.

Transport Layer Security (TLS) and its predecessor, Secure Sockets Layer (SSL), both frequently referred to as "SSL", are cryptographic protocols that provide data security over a network. Thus, TLS provides data privacy and integrity between two communicating devices. In other words, TLS is designed to prevent data eavesdropping and tampering by unknown third parties connected to the network.

TLS uses a handshake procedure with an asymmetric cipher to establish not only cipher settings, but also a session-specific shared key with which further communication is encrypted using a symmetric cipher. During the handshake, a client and server agree on various parameters used to establish the connection's security. The handshake begins when a client connects to a TLS-enabled server requesting a secure connection and the client presents a list of supported cipher suites (i.e., ciphers and hash functions). From that list, the server picks a cipher and hash function that the server also supports and notifies the client of the decision. The server then sends back its identification in the form of a digital certificate. The certificate contains the server name, the trusted certificate authority that vouches for the authenticity of the certificate, and the server's public encryption key. The client confirms the validity of the certificate before proceeding.

To generate the session keys used for the secure connection, the client encrypts a random number with the server's public key and sends the result to the server (which only the server should be able to decrypt with its private key). Both parties then use the random number to generate a unique session key for subsequent encryption and decryption of data during the session. Alternatively, the client may use a Diffie-Hellman key exchange to securely generate a random and unique session key for encryption and decryption that has the additional property of forward secrecy. If the server's private key is disclosed in the future, the private key cannot be used to decrypt the current session, even if the session is intercepted and recorded by a third party. At this point the handshake is concluded and the secure connection begins, which is encrypted and decrypted with the session key until the connection closes. It should be noted that if one of the handshake steps fails, then the secure connection is not created. Also, it should be noted that TLS/SSL is resource intensive while setting up secure connections (i.e., during the key generation process).

Internet of Things (IoT) is a network of physical devices embedded with, for example, electronics, software, sensors, actuators, and network connectivity, which enable these devices to collect and exchange data. Experts estimate that IoT will consist of about 30 billion devices and generate 507.5 zetta bytes (e.g., 1 zetta byte=1 trillion gigabytes) by 2020. IoT refers to a wide variety of devices, such as, for example, smart thermostats, smart appliances, heart monitoring implants, pacemakers, smart exercise monitors, bio-chip transponders, streaming video cameras, vehicles with built-in sensors, and the like. These devices collect useful and oftentimes sensitive data and then autonomously flow this data to other devices via a network. As a result, data security and privacy are a concern with IoT devices. However, typically these IoT devices have a limited amount of resources, such as CPU, memory, and power. Consequently, because TLS/SSL is resource intensive, IoT devices normally do not use TLS/SSL as a way to secure data for transport via a network.

SUMMARY

According to one illustrative embodiment, a computer-implemented method for establishing Transport Layer Security/Secure Sockets Layer (TLS/SSL) sessions with destination servers for Internet of Things (IoT) devices is provided. A request is sent to establish a TLS/SSL session with a target destination server in a set of destination servers using destination server information related to a particular IoT device in a plurality of IoT devices. A TLS/SSL session is established with the target destination server corresponding to the particular IoT device. TLS/SSL session credential information is received for the particular IoT device from the target destination server. The TLS/SSL session credential information for the particular IoT device is saved in a session credential information table. The TLS/SSL session is suspended with the target destination server corresponding to the particular IoT device. According to other illustrative embodiments, a computer system and computer program product for establishing TLS/SSL sessions with destination servers for IoT devices are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-6, diagrams of data processing environments are provided in which illustrative embodiments may be implemented. It should be appreciated that FIGS. 1-6 are only meant as examples and are not intended to assert or imply any limitation with regard to the environments in which different embodiments may be implemented. Many modifications to the depicted environments may be made.

Figure 1:
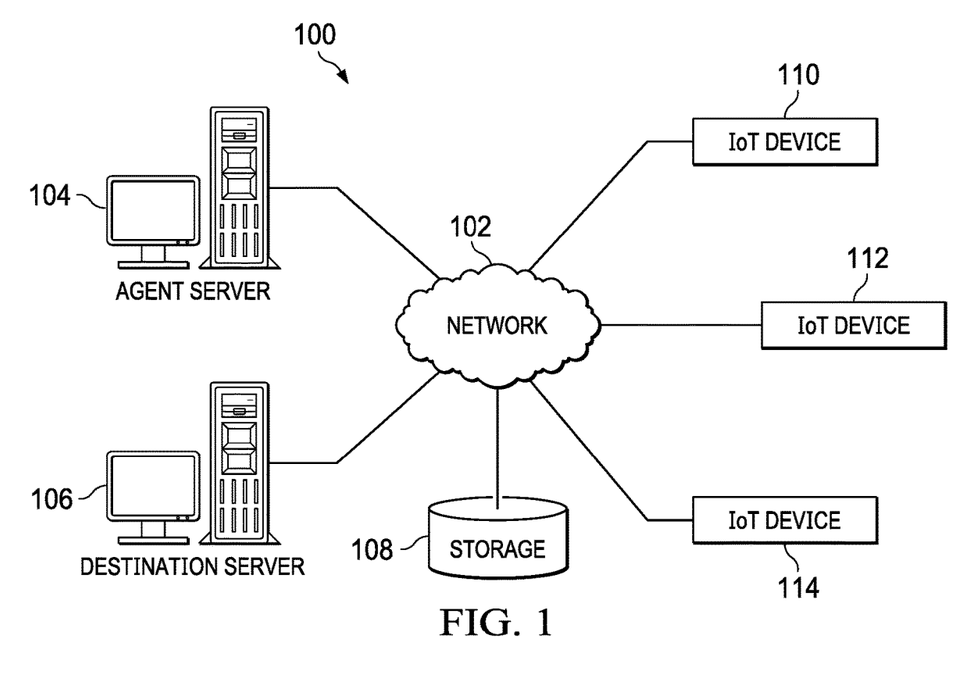
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers, Internet of Things (IoT) devices, and other devices in which the illustrative embodiments may be implemented. Network data processing system 100 contains network 102, which is the medium used to provide communications links between the computers, IoT devices, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide different services to client devices. For example, server 104 is an agent server that initially establishes Transport Layer Security/Secure Sockets Layer (TLS/SSL) sessions with a set of destination servers for client IoT devices and sends TLS/SSL session credential information to a requesting client IoT device for the requesting client IoT device to resume a previously established TLS/SSL session with a target destination server, such as destination server 106. Destination server 106 may, for example, collect, store, and/or analyze data received from client IoT devices connected to destination server 106 via a TLS/SSL session. In addition, destination server 106 may, for example, direct a client IoT device to perform an action or task based on analysis of the data received from the client IoT device. It should be noted that agent server 104 and destination server 106 may each represent a plurality of different agent and destination servers.

IoT device 110, IoT device 112, and IoT device 114 also connect to network 102. IoT devices 110, 112, and 114 are clients of agent server 104 and destination server 106. It should be noted that IoT devices 110, 112, and 114 may represent any type of IoT device or combination of IoT devices with wire or wireless communication links to network 102. For example, IoT devices 110, 112, and 114 may represent smart phones, smart televisions, smart thermostats, smart appliances, heart monitors, pacemakers, exercise monitors, biochip transponders, imaging devices, smart vehicles, sensors, and the like.

Storage 108 is a network storage device capable of storing any type of data in a structured format or an unstructured format. In addition, storage 108 may represent a set of one or more network storage devices. Storage 108 may store, for example, identifiers and network addresses for a plurality of different IoT devices; identifiers and network addresses for a plurality of different agent servers; identifiers and network addresses for a plurality of different destination servers; and the like. Further, storage 108 may store other data, such as authentication or credential data that may include user names, passwords, and biometric data associated with users and system administrators, for example.

In addition, it should be noted that network data processing system 100 may include any number of additional server devices, client IoT devices, and other devices not shown. Program code located in network data processing system 100 may be stored on a computer readable storage medium and downloaded to a computer or data processing system for use. For example, program code may be stored on a computer readable storage medium on agent server 104 and downloaded to IoT device 110 over network 102 for use on IoT device 110.

In the depicted example, network data processing system 100 may be implemented as a number of different types of communication networks, such as, for example, an internet, an intranet, a local area network (LAN), a secure LAN, a personal area network (PAN), a peer-to-peer network, an ad-hoc peer-to-peer network, a wide area network (WAN), or any combination thereof. FIG. 1 is intended as an example only, and not as an architectural limitation for the different illustrative embodiments.

Figure 2:
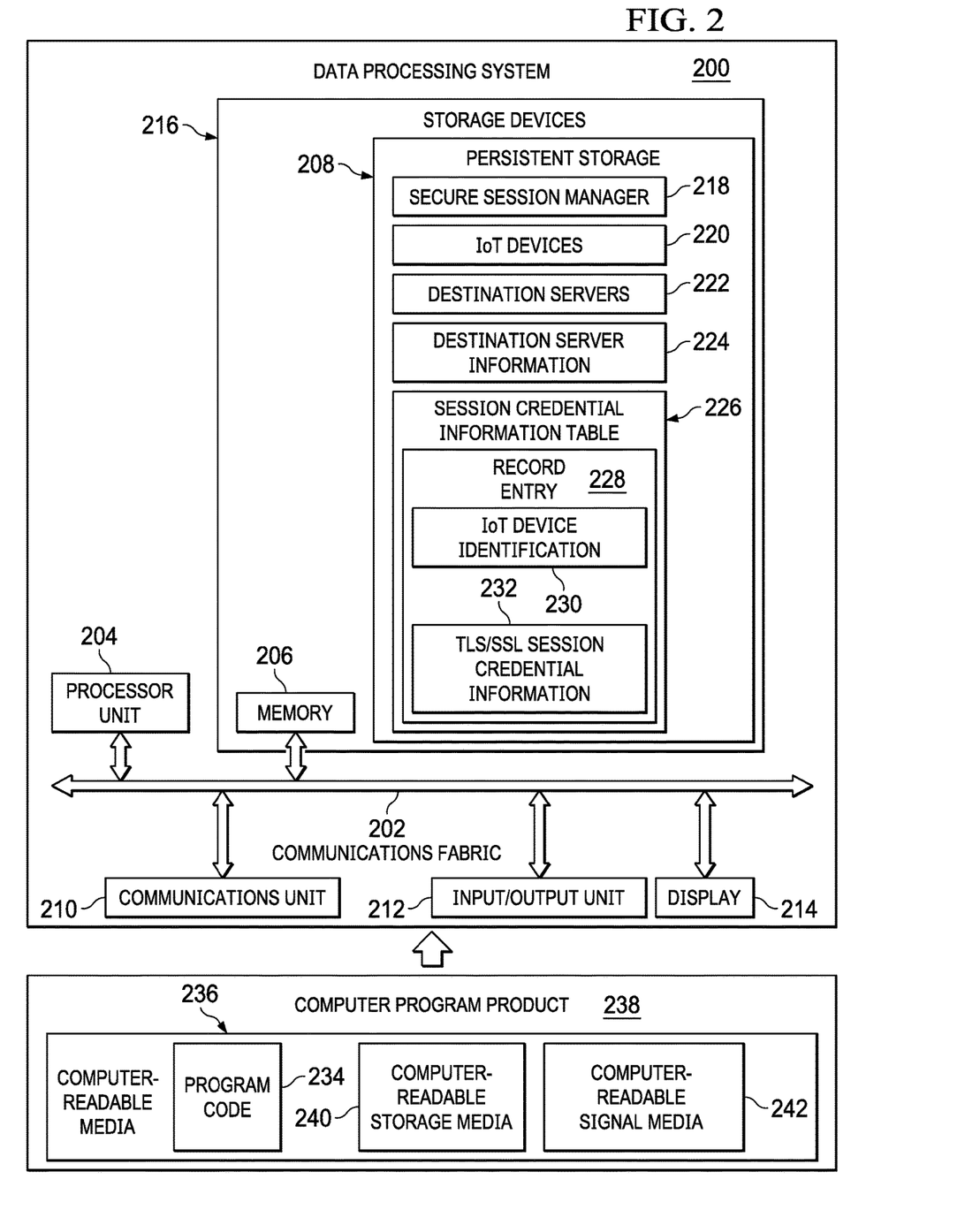
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as agent server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. In this example, processor unit 204 may represent a set of two or more hardware processor devices or may represent one processor device with two or more processor cores, depending on the particular implementation. Further, different illustrative embodiments may implement processor unit 204 using multiple heterogeneous processors or using multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores secure session manager 218. However, it should be noted that even though secure session manager 218 is illustrated as residing in persistent storage 208, in an alternative illustrative embodiment secure session manager 218 may be a separate component of data processing system 200. For example, secure session manager 218 may be a hardware component coupled to communication fabric 202 or a combination of hardware and software components. Secure session manager 218 controls the process of establishing TLS/SSL session connections with target destination servers for IoT devices connected to data processing system 200 via a secure network, such as a private LAN, and sending TLS/SSL session credential information to IoT devices requesting TLS/SSL sessions with corresponding target destination servers so that the requesting IoT devices may resume previously established TLS/SSL sessions with their corresponding target destination servers.

Also in this example, persistent storage 208 stores IoT devices 220, destination servers 222, destination server information 224, and session credential information table 226. IoT devices 220 represent a list of a plurality of IoT devices, such as IoT devices 110-114 in FIG. 1, connected to data processing system 200 via a secure network, along with identifiers and network addresses of each respective IoT device in the list. Destination servers 222 represent a list of a set of one or more target destination servers, which correspond to IoT devices 220, along with identifiers and network addresses of each respective destination server in the list.

Destination server information 224 identifies a corresponding target destination server, such as destination server 106 in FIG. 1, for each respective IoT device in IoT devices 220. Secure session manager 218 may retrieve destination server information 224 from each respective IoT device in IoT devices 220. Alternatively, secure session manager 218 may, for example, statistically infer destination server information 224 by analyzing historical data regarding which destination server a respective IoT device had previously connected to in the past.

Session credential information table 226 represents a table containing a plurality of record entries that map respective IoT devices in IoT devices 220 to corresponding TLS/SSL session credential information associated with TLS/SSL sessions previously established by secure session manager 218 for each of IoT devices 220. In this example, session credential information table 226 includes record entry 228. It should be noted that record entry 228 represents a plurality of record entries, one record entry for each IoT device in IoT devices 220.

In this example, record entry 228 includes IoT device identifier (ID) 230 and TLS/SSL session credential information 232. IoT device ID 230 represents a unique identifier corresponding to a particular IoT device in IoT devices 220. TLS/SSL session credential information 232 represents data, such as, for example, a session ID, a session ticket, a session key, and the like, which corresponds to a particular TLS/SSL session with a particular target destination server.

Secure session manager 218 uses destination server information 224 to establish a plurality of TLS/SSL sessions with target destination servers for IoT devices 220. Secure session manager 218 uses record entry 228 to identify and send TLS/SSL session credential information 232 to a requesting IoT device that corresponds to IoT device ID 230. In other words, when secure session manager 218 receives a TLS/SSL connection request from a particular IoT device, secure session manager 218 searches session credential information table 226 for the ID corresponding to that particular IoT device, such as IoT device ID 230. When secure session manager 218 finds the ID for that particular IoT device in a record entry, secure session manager 218 sends the TLS/SSL session credential information in that record entry, such as TLS/SSL session credential information 232, to that particular IoT device. After receiving TLS/SSL session credential information 232, the IoT device corresponding to IoT device ID 230 may resume the previously established TLS/SSL session with the corresponding target destination server in destination servers 222.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (WiFi), Bluetooth® technology, near field communication, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 234 is located in a functional form on computer readable media 236 that is selectively removable and may be loaded onto or transferred to data processing system 200 for running by processor unit 204. Program code 234 and computer readable media 236 form computer program product 238. In one example, computer readable media 236 may be computer readable storage media 240 or computer readable signal media 242. Computer readable storage media 240 may include, for example, an optical or magnetic disc that is inserted or placed into a drive or other device that is part of persistent storage 208 for transfer onto a storage device, such as a hard drive, that is part of persistent storage 208. Computer readable storage media 240 also may take the form of a persistent storage, such as a hard drive, a thumb drive, or a flash memory that is connected to data processing system 200. In some instances, computer readable storage media 240 may not be removable from data processing system 200.

Alternatively, program code 234 may be transferred to data processing system 200 using computer readable signal media 242. Computer readable signal media 242 may be, for example, a propagated data signal containing program code 234. For example, computer readable signal media 242 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 234 may be downloaded over a network to persistent storage 208 from another device or data processing system through computer readable signal media 242 for use within data processing system 200. For instance, program code stored in a computer readable storage media in a data processing system may be downloaded over a network from the data processing system to data processing system 200. The data processing system providing program code 234 may be a server computer, a client computer, or some other device capable of storing and transmitting program code 234.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 240 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

TLS/SSL provides a secure way to transfer data between devices via an unsecure network, such as the Internet. TLS/SSL session creation is extremely expensive for resource limited devices, such as IoT devices, with limited computing resources, memory space, and power levels, for example. However, it is also important to provide data privacy and data integrity when transmitting data between respective IoT devices and their corresponding target destination servers to prevent sensitive data from being leaked to unknown third parties or preventing unknown third parties from taking control of the devices to launch a distributed denial-of-service attack, for example. Illustrative embodiments provide a mechanism to overcome the drawback of IoT device limited computing resource and still be able to utilize the advantage of data security and integrity provided by TLS/SSL.

Illustrative embodiments utilize an agent server to establish TLS/SSL connections with target destination servers in advance and stores the TLS/SSL session credential information (e.g., session identifier, session ticket, session key, and the like) for each of a plurality of IoT devices. In other words, the agent server maintains a table that maps TLS/SSL session credential information to each particular IoT device connected to the agent server. After a TLS/SSL negotiation phase is completed, the agent server suspends the TLS/SSL session. When an IoT device wants to establish a TLS/SSL session with a corresponding target destination server, the IoT device sends a request via a trusted or secure network connection to the agent server requesting TLS/SSL session credential information corresponding to the corresponding target destination server. After receiving the TLS/SSL session credential information corresponding to the target destination server from the agent server, the IoT device resumes the previously established TLS/SSL session with the target destination server using the received TLS/SSL session credential information. In other words, the IoT device offloads the TLS/SSL handshake process to the agent server to establish the TLS/SSL session with the corresponding target destination server.

As a result, illustrative embodiments provide resource-limited IoT devices with a way to utilize the network data security of TLS/SSL communications. In addition, illustrative embodiments reduce IoT device resource cost to establish a TLS/SSL session (e.g., an IoT device doesn't need to maintain TLS/SSL certificate updates or perform a TLS/SSL handshake with a target destination server). Further, illustrative embodiments enable IoT devices to start TLS/SSL communication quickly (i.e., IoT devices just resume the TLS/SSL session previously established by the agent server with the corresponding target destination server, which saves TLS/SSL negotiation time between the IoT devices and corresponding target destination servers). Further, the agent server does not proxy data transmitted between an IoT device and a corresponding target destination server. Consequently, the agent server may be a relatively light-weight machine as compared with a typical TLS/SSL proxy. Moreover, illustrative embodiments may increase fault tolerance by the agent server not being involved with data communication between an IoT device and a corresponding target destination server. In other words, the TLS/SSL session connection between the IoT device and the corresponding target destination server will not be affected by the agent server crashing and being down temporarily, for example.

It should be noted that illustrative embodiments may be implemented in an instruction prevention system (IPS) or intrusion detection system (IDS) device that connects an IoT device with a trusted or secure network. In other words, the agent server may share or export the TLS/SSL session credential information with the IPS or IDS device. Thus, illustrative embodiments also may increase security enforcement for IoT devices.

Figure 3:
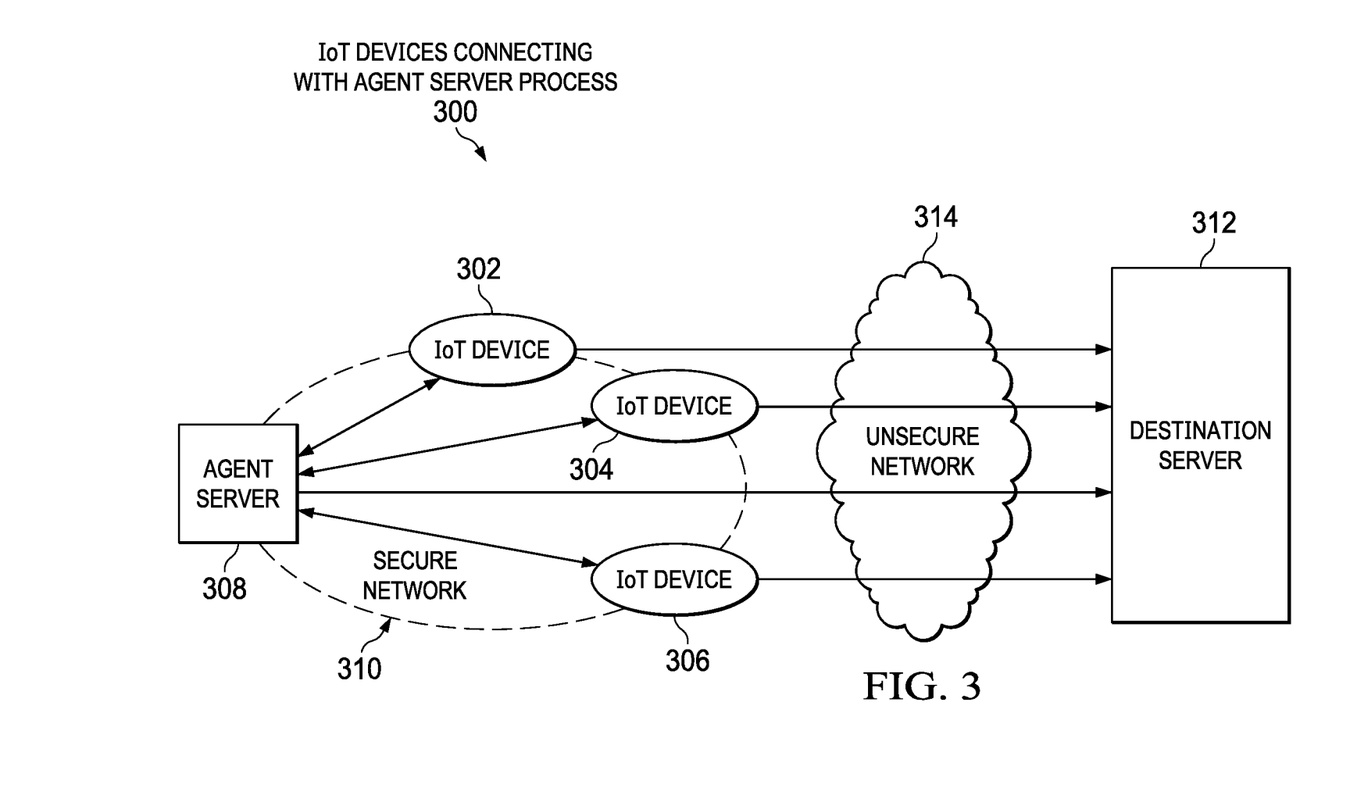
FIG. 3 is a diagram of Internet of Things (IoT) devices connecting with an agent server via a secure network in which illustrative embodiments may be implemented.

With reference now to FIG. 3, a diagram of IoT devices connecting with an agent server via a secure network is depicted in which illustrative embodiments may be implemented. IoT devices connecting with agent server process 300 may be implemented in a network of data processing systems, such as, for example, network data processing system 100 in FIG. 1.

In this example, IoT device 302, IoT device 304, and IoT device 306 connect to agent server 308 via secure network 310. IoT device 302, IoT device 304, and IoT device 306 may be, for example, IoT device 110, IoT device 112, and IoT device 114 in FIG. 1. Agent server 308 may be, for example, agent server 104 in FIG. 1 or data processing system 200 in FIG. 2. Secure network 310 may be, for example, a private LAN or similar type of secure network with restricted access. Also, IoT devices 302-306 may represent any type or combination of IoT devices connected to agent server 308.

In addition, IoT devices 302-306 and agent server 308 are connected to destination server 312, such as destination server 106 in FIG. 1, via unsecure network 314. It should be noted that destination server 312 may represent a set of one or more target destination servers corresponding to IoT devices 302-306. Unsecure network 314 may be, for example, the Internet or similar type of unsecure network with open access. Agent server 308 performs a handshake process to establish TLS/SSL sessions with destination server 312 for each of IoT device 302, IoT device 304, and IoT device 306.

Figure 4:
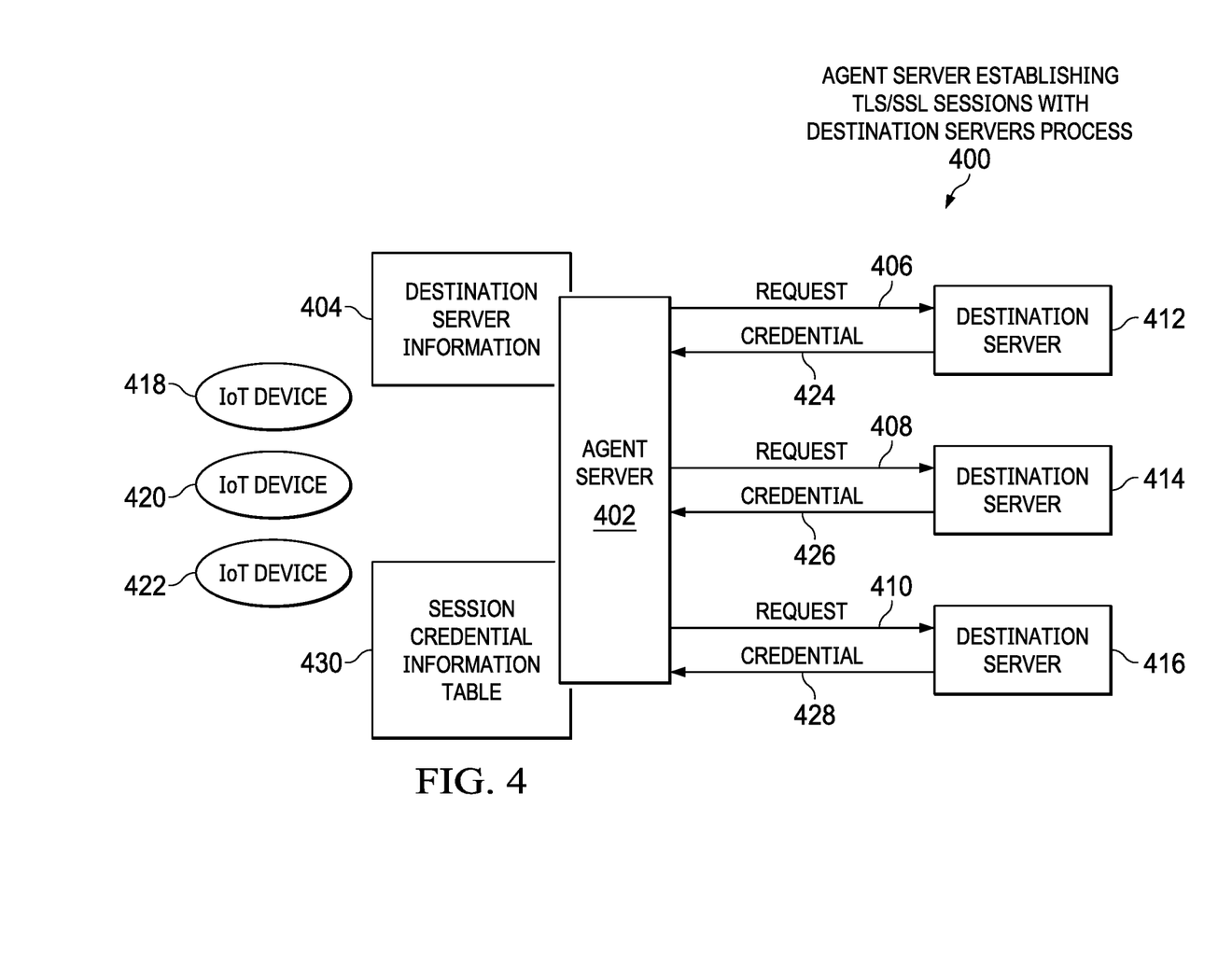
FIG. 4 is a diagram of an agent server establishing Transport Layer Security/Secure Sockets Layer (TLS/SSL) sessions with a set of target destination servers corresponding to a plurality of IoT devices in accordance with an illustrative embodiment.

With reference now to FIG. 4, a diagram of an agent server establishing TLS/SSL sessions with a set of target destination servers corresponding to a plurality of IoT devices is depicted in accordance with an illustrative embodiment. In agent server establishing TLS/SSL sessions with destination servers process 400, agent server 402 utilizes destination server information 404 to send TLS/SSL connection request 406, TLS/SSL connection request 408, and TLS/SSL connection request 410 to destination server 412, destination server 414, and destination server 412, respectively. Agent server 402 may be, for example, agent server 308 in FIG. 3. Destination server information 404 may be, for example, destination server information 224 in FIG. 2.

Destination server information 404 identifies a corresponding target destination server for each respective IoT device, such as IoT device 418, IoT device 420, and IoT device 422, connected to agent server 402. IoT device 418, IoT device 420, and IoT device 422 may be, for example, IoT device 302, IoT device 304, and IoT device 306 in FIG. 3. In this example, destination server 412, destination server 414, and destination server 412 may correspond to IoT device 418, IoT device 420, and IoT device 422, respectively. However, it should be noted that IoT device 418, IoT device 420, and IoT device 422 may each correspond to the same target destination server or to different target destination servers. In other words, many different combinations of IoT devices to target destination servers may exist.

In response to receiving TLS/SSL connection request 406, TLS/SSL connection request 408, and TLS/SSL connection request 410 and establishing TLS/SSL sessions for each of the requests, destination server 412, destination server 414, and destination server 412 send TLS/SSL session credential information 424, TLS/SSL session credential information 426, and TLS/SSL session credential information 428, respectively, to agent server 402. After receiving TLS/SSL session credential information 424, 426, and 428, agent server 402 suspends each established TLS/SSL session and stores TLS/SSL session credential information 424, 426, and 428 in a separate record entry for each of IoT device 418, 420, and 422 within session credential information table 430. Each separate record entry within session credential information table 430 may be, for example, record entry 228 within session credential information table 226 in FIG. 2.

Figure 5:
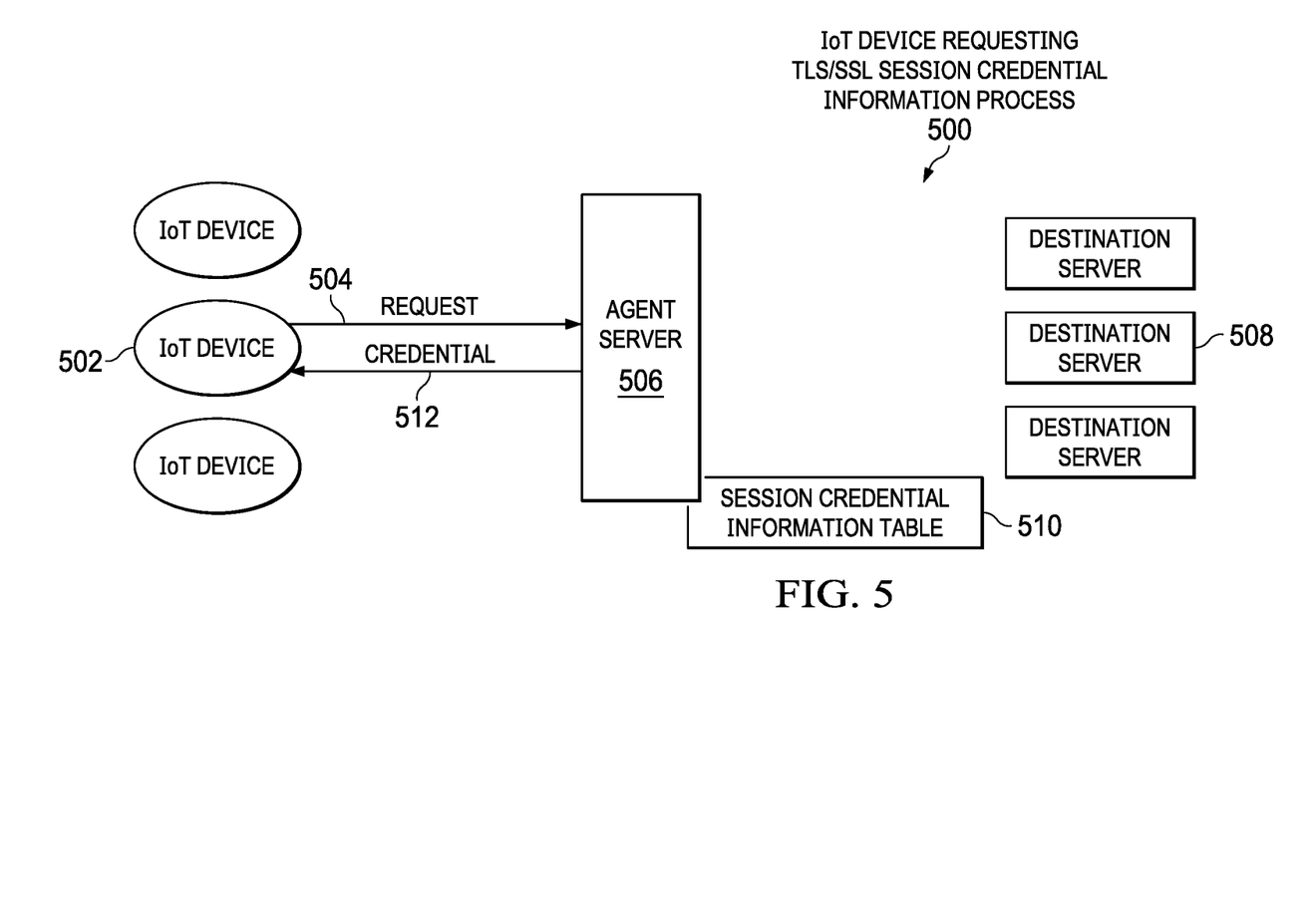
FIG. 5 is a diagram of an IoT device requesting TLS/SSL session credential information from an agent server in accordance with an illustrative embodiment.

With reference now to FIG. 5, a diagram of an IoT device requesting TLS/SSL session credential information from an agent server is depicted in accordance with an illustrative embodiment. In IoT device requesting TLS/SSL session credential information process 500, IoT device 502 sends TLS/SSL session connection request 504 to agent server 506 to resume a previously established TLS/SSL session by agent server 506 with corresponding target destination server 508. IoT device 502, agent server 506, and destination server 508 may be, for example, IoT device 420, agent server 402, and destination server 414 in FIG. 4.

In response to receiving TLS/SSL session connection request 504 from IoT device 502, agent server 506 searches session credential information table 510, such as session credential information table 430 in FIG. 4, for an ID corresponding IoT device 502 within a record entry. The ID corresponding to IoT device 502 may be, for example, IoT device ID 230 within record entry 228 in FIG. 2. After locating the ID corresponding to IoT device 502 within a record entry, agent server retrieves the TLS/SSL session credential information, such as TLS/SSL session credential information 232 in FIG. 2, from that record entry. Then, agent server 506 sends TLS/SSL session credential information 512, which is the same information retrieved from the record entry corresponding to IoT device 502, to IoT device 502 via a secure network, such as secure network 310 in FIG. 3.

Figure 6:
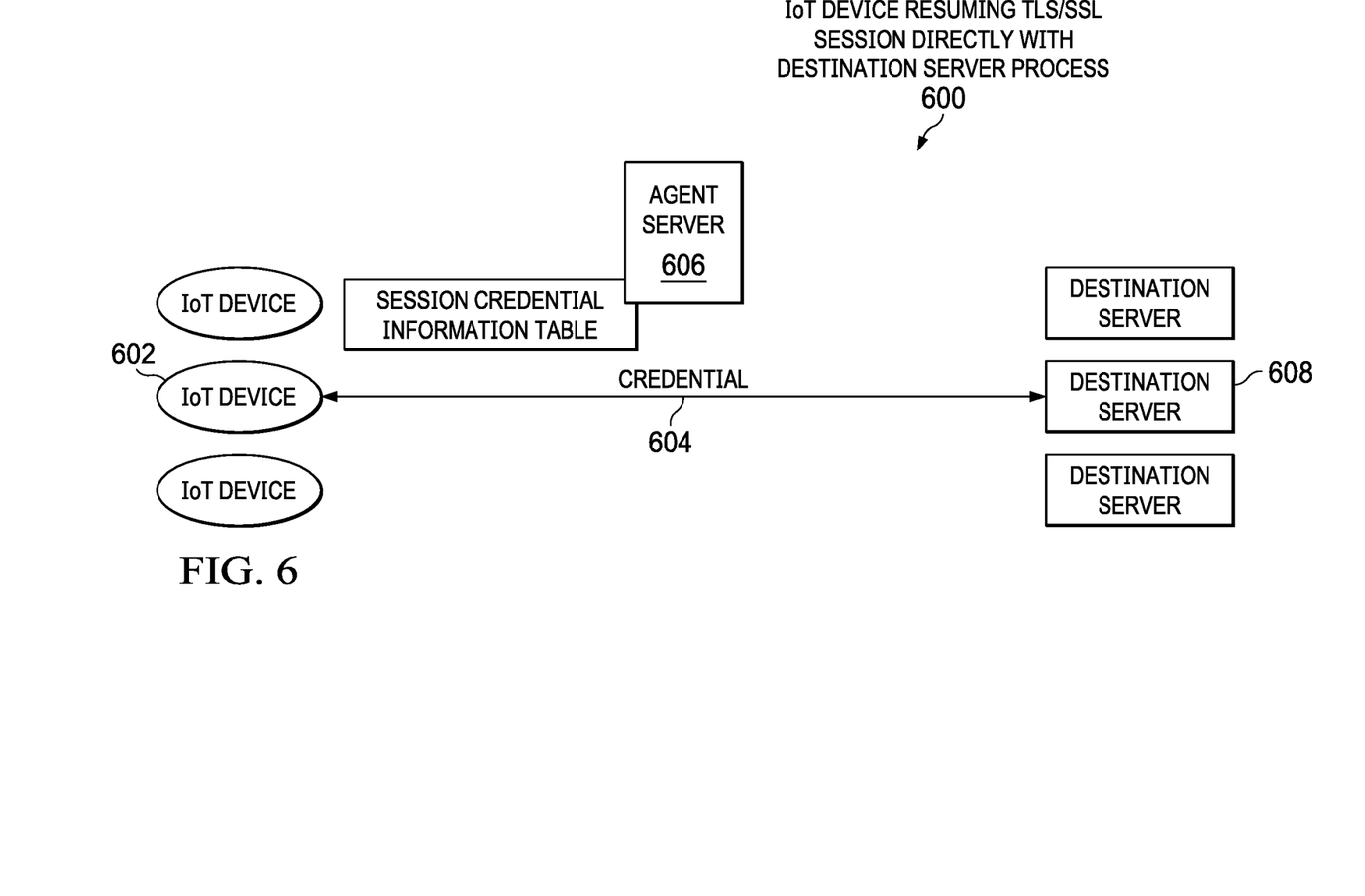
FIG. 6 is a diagram of an IoT device resuming a TLS/SSL session with a corresponding target destination server using TLS/SSL session credential information received from an agent server in accordance with an illustrative embodiment.

With reference now to FIG. 6, a diagram of an IoT device resuming a TLS/SSL session with a corresponding target destination server using TLS/SSL session credential information received from an agent server is depicted in accordance with an illustrative embodiment. In IoT device resuming TLS/SSL session with destination server directly process 600, IoT device 602 utilizes TLS/SSL session credential information 604, which IoT device 602 received from agent server 606, to resume a previously established TLS/SSL session by agent server 606 directly with corresponding target destination server 608. IoT device 602, agent server 606, and destination server 608 may be, for example, IoT device 502, agent server 506, and destination server 508 in FIG. 5.

Figure 7:
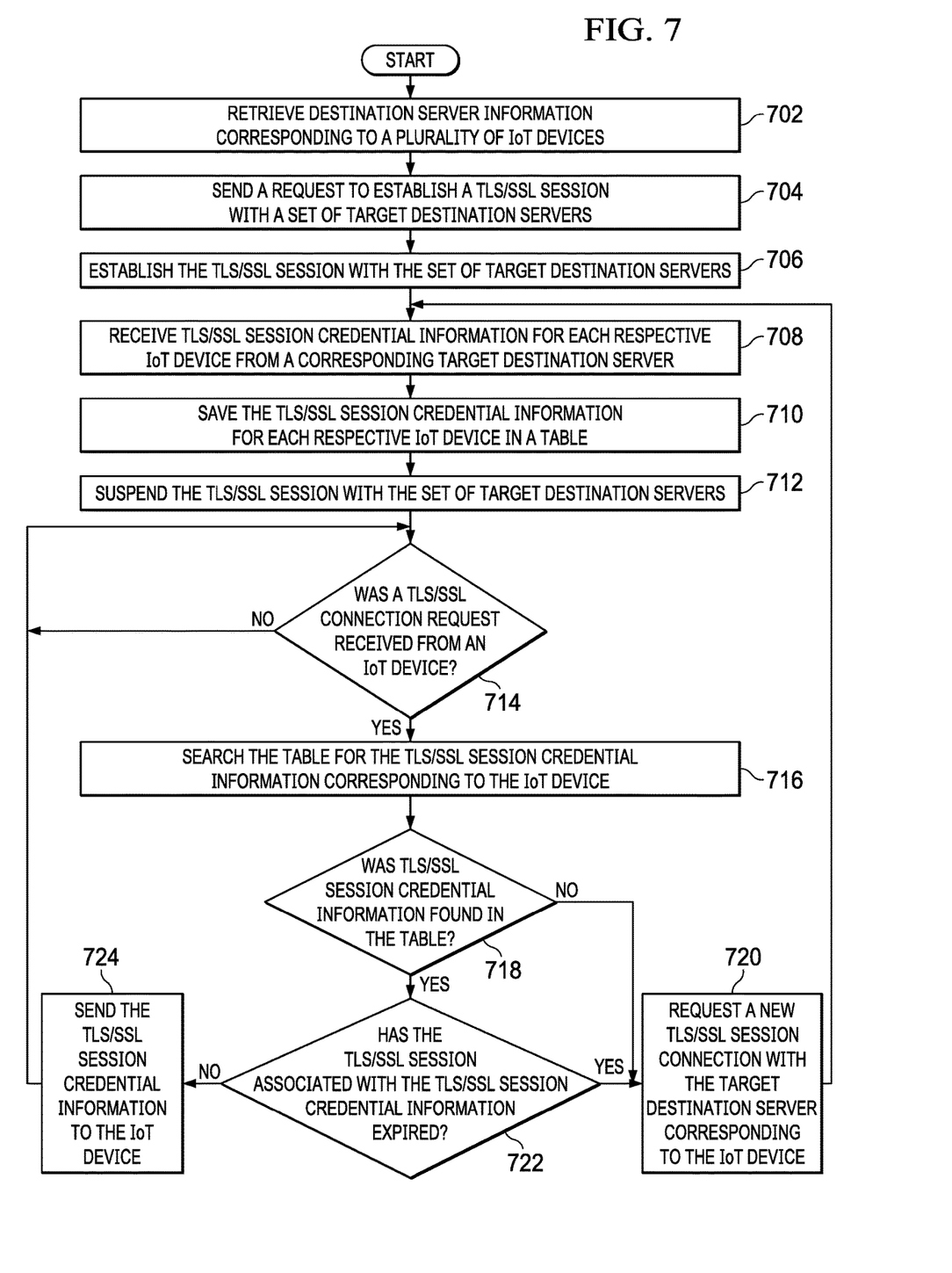
FIG. 7 is a flowchart illustrating a process for providing an IoT device with TLS/SSL session credential information to resume a TLS/SSL session with a target destination server in accordance with an illustrative embodiment.

With reference now to FIG. 7, a flowchart illustrating a process for providing an IoT device with TLS/SSL session credential information to resume a TLS/SSL session with a target destination server is shown in accordance with an illustrative embodiment. The process shown in FIG. 7 may be implemented in a computer, such as, for example, agent server 104 in FIG. 1 or data processing system 200 in FIG. 2.

The process begins when the computer retrieves destination server information corresponding to a plurality of IoT devices connected to the computer via a secure network (step 702). The destination server information may be, for example, destination server information 224 in FIG. 2 or destination server information 404 in FIG. 4. The destination server information identifies a corresponding target destination server for each respective IoT device in the plurality of IoT devices, such as IoT devices 424-428 in FIG. 4. The corresponding target destination servers may be, for example, destination servers 412-416 in FIG. 4. The computer may retrieve the destination server information from a storage device of the computer, such as, for example, persistent storage 208 in FIG. 2. The stored destination server information may be, for example, historical data regarding which destination server a respective IoT device has connected to in the past. Alternatively, the computer may retrieve the destination server information from each respective IoT device in the plurality of IoT devices. The secure network may be, for example, secure network 310 in FIG. 3.

Afterward, the computer sends a request to establish a TLS/SSL session with each target destination server in a set of one or more target destination servers using the retrieved destination server information corresponding to the plurality of IoT devices (step 704). Subsequently, the computer establishes the TLS/SSL session with each target destination server in the set of target destination servers corresponding to the plurality of IoT devices (step 706). In addition, the computer receives TLS/SSL session credential information for each respective IoT device in the plurality of IoT devices from a corresponding target destination server in the set of target destination servers (step 708). The TLS/SSL session credential information may be, for example, TLS/SSL session credential information 232 in FIG. 2. The computer saves the TLS/SSL session credential information for each respective IoT device in a session credential information table, such as session credential information table 226 in FIG. 2 (step 710). Further, the computer suspends the TLS/SSL session with each target destination server in the set of target destination servers corresponding to the plurality of IoT devices (step 712).

The computer makes a determination as to whether a TLS/SSL connection request was received from an IoT device in the plurality of IoT devices to establish a TLS/SSL session with the IoT device's corresponding target destination server in the set of target destination servers (step 714). If computer determines that a TLS/SSL connection request was not received from an IoT device, no output of step 714, then the process returns to step 714 where the computer waits for a TLS/SSL connection request. If computer determines that a TLS/SSL connection request was received from an IoT device, yes output of step 714, then the computer searches the session credential information table for TLS/SSL session credential information corresponding to the IoT device using an identifier of the IoT device (step 716).

Afterward, the computer makes a determination as to whether TLS/SSL session credential information corresponding to the IoT device was found in the session credential information table (step 718). If the computer determines that TLS/SSL session credential information corresponding to the IoT device was not found in the session credential information table, no output of step 718, then the computer requests a new TLS/SSL session connection with the target destination server corresponding to the IoT device (step 720). Thereafter, the process returns to step 708 where the computer receives the new TLS/SSL session credential information for the IoT device.

If the computer determines that the TLS/SSL session credential information corresponding to the IoT device was found in the session credential information table, yes output of step 718, then the computer makes a determination as to whether the TLS/SSL session associated with the TLS/SSL session credential information corresponding to the IoT device expired (step 722). If the computer determines that the TLS/SSL session associated with the TLS/SSL session credential information corresponding to the IoT device did expire, yes output of step 722, then the process returns to step 720 where the computer requests a new TLS/SSL session connection with the target destination server corresponding to the IoT device. If the computer determines that the TLS/SSL session associated with the TLS/SSL session credential information corresponding to the IoT device did not expire, no output of step 722, then the computer sends the TLS/SSL session credential information to the IoT device for the IoT device to resume the TLS/SSL session with the target destination server directly (step 724). Thereafter, the process returns to step 714 where the computer waits for another TLS/SSL connection request from an IoT device.

Thus, illustrative embodiments of the present invention provide a computer-implemented method, computer system, and computer program product for quickly establishing a TLS/SSL session between an IoT device and a corresponding target destination server using TLS/SSL session credential information provided by an agent server to the IoT device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for establishing Transport Layer Security/Secure Sockets Layer (TLS/SSL) sessions with destination servers for Internet of Things (IoT) devices, the method comprising:

sending a request to establish a TLS/SSL session with a target destination server in a set of destination servers using destination server information related to a particular IoT device in a plurality of IoT devices;

establishing the TLS/SSL session with the target destination server corresponding to the particular IoT device;

receiving TLS/SSL session credential information for the particular IoT device from the target destination server;

saving the TLS/SSL session credential information for the particular IoT device in a session credential information table;

suspending the TLS/SSL session with the target destination server corresponding to the particular IoT device;

determining whether a TLS/SSL connection request was received from the particular IoT device in the plurality of IoT devices; and responsive to determining that the TLS/SSL connection request was received from the particular IoT device in the plurality of IoT devices, searching the session credential information table for the TLS/SSL session credential information corresponding to the particular IoT device, wherein the method of establishing TLS/SSL sessions is performed by an agent server coupled to the destination servers and the plurality of IoT devices.

2. The method of claim 1 further comprising:

retrieving the destination server information related to the particular IoT device, wherein destination server information is historical data regarding which destination server in the set of destination servers the particular IoT device in the plurality of IoT devices has connected to in the past.

3. The method of claim 1 further comprising:

determining whether the TLS/SSL session credential information corresponding to the particular IoT device was found in the session credential information table; and responsive to determining that the TLS/SSL session credential information corresponding to the particular IoT device was not found in the session credential information table, requesting a new TLS/SSL session connection with the target destination server corresponding to the particular IoT device.

4. The method of claim 3 further comprising:
in response to determining that the TLS/SSL session credential information corresponding to the particular IoT device was found in the session credential information table, determining whether the TLS/SSL session associated with the TLS/SSL session credential information corresponding to the particular IoT device expired.

5. The method of claim 4 further comprising:
responsive to determining that the TLS/SSL session associated with the TLS/SSL session credential information corresponding to the particular IoT device did not expire, sending the TLS/SSL session credential information to the particular IoT device for the particular IoT device to resume the TLS/SSL session with the target destination server directly.

6. The method of claim 1, wherein the TLS/SSL session credential information includes one or more of a session identifier, a session ticket, and a session key.

7. The method of claim 1, wherein the plurality of IoT devices are connected to an agent server via a secure network.

8. The method of claim 7, wherein the agent server is connected to the set of destination servers via an unsecure network.

9. A system for establishing Transport Layer Security/Secure Sockets Layer (TLS/SSL) sessions with destination servers for Internet of Things (IoT) devices, the system comprising:
a bus system;
a storage device connected to the bus system, wherein the storage device stores program instructions; and
a processor connected to the bus system, wherein the processor executes the program instructions to:
send a request to establish a TLS/SSL session with a target destination server in a set of destination servers using destination server information related to a particular IoT device in a plurality of IoT devices;
establish the TLS/SSL session with the target destination server corresponding to the particular IoT device;
receive TLS/SSL session credential information for the particular IoT device from the target destination server;
save the TLS/SSL session credential information for the particular IoT device in a session credential information table;
suspend the TLS/SSL session with the target destination server corresponding to the particular IoT device;
determine whether a TLS/SSL connection request was received from the particular IoT device in the plurality of IoT devices; and
search the session credential information table for the TLS/SSL session credential information corresponding to the particular IoT device in response to determining that the TLS/SSL connection request was received from the particular IoT device in the plurality of IoT devices;
wherein the system is an agent server coupled to the destination servers and the plurality of IoT devices.

10. The system of claim 9, wherein the processor further executes the program instructions to:

retrieve the destination server information related to the particular IoT device, wherein destination server information is historical data regarding which destination server in the set of destination servers the particular IoT device in the plurality of IoT devices has connected to in the past.

11. The system of claim 9, wherein the processor further executes the program instructions to:
determine whether the TLS/SSL session credential information corresponding to the particular IoT device was found in the session credential information table; and
request a new TLS/SSL session connection with the target destination server corresponding to the particular IoT device in response to determining that the TLS/SSL session credential information corresponding to the particular IoT device was not found in the session credential information table.

12. A computer program product for establishing Transport Layer Security/Secure Sockets Layer (TLS/SSL) sessions with destination servers for Internet of Things (IoT) devices, the computer program product comprising a computer readable storage medium having program instructions embodied therewith, the program instructions executable by a computer to cause the computer to perform a method comprising:
sending a request to establish a TLS/SSL session with a target destination server in a set of destination servers using destination server information related to a particular IoT device in a plurality of IoT devices;
establishing the TLS/SSL session with the target destination server corresponding to the particular IoT device;
receiving TLS/SSL session credential information for the particular IoT device from the target destination server;
saving the TLS/SSL session credential information for the particular IoT device in a session credential information table;
suspending the TLS/SSL session with the target destination server corresponding to the particular IoT device;
determining whether a TLS/SSL connection request was received from the particular IoT device in the plurality of IoT devices; and
responsive to determining that the TLS/SSL connection request was received from the particular IoT device in the plurality of IoT devices, searching the session credential information table for the TLS/SSL session credential information corresponding to the particular IoT device, wherein the computer program product is configured to be executed by an agent server coupled to the destination servers and the plurality of IoT devices.

13. The computer program product of claim 12 further comprising:
retrieving the destination server information related to the particular IoT device, wherein destination server information is historical data regarding which destination server in the set of destination servers the particular IoT device in the plurality of IoT devices has connected to in the past.

14. The computer program product of claim 12 further comprising:
determining whether the TLS/SSL session credential information corresponding to the particular IoT device was found in the session credential information table; and
responsive to determining that the TLS/SSL session credential information corresponding to the particular IoT device was not found in the session credential information table, requesting a new TLS/SSL session connection with the target destination server corresponding to the particular IoT device.

15. The computer program product of claim 14 further comprising:
   in response to determining that the TLS/SSL session credential information corresponding to the particular IoT device was found in the session credential information table, determining whether the TLS/SSL session associated with the TLS/SSL session credential information corresponding to the particular IoT device expired.

16. The computer program product of claim 15 further comprising:
   responsive to determining that the TLS/SSL session associated with the TLS/SSL session credential information corresponding to the particular IoT device did not expire, sending the TLS/SSL session credential information to the particular IoT device for the particular IoT device to resume the TLS/SSL session with the target destination server directly.

17. The computer program product of claim 12, wherein the TLS/SSL session credential information includes one or more of a session identifier, a session ticket, and a session key.

* * * * *